(12) United States Patent
Schwartz et al.

(10) Patent No.: US 8,396,969 B1
(45) Date of Patent: Mar. 12, 2013

(54) DOMAIN NAME BUCKETS IN A HOSTED STORAGE SYSTEM

(75) Inventors: Michael F. Schwartz, Seattle, WA (US); David Erb, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/252,426

(22) Filed: Oct. 4, 2011

Related U.S. Application Data (63) Continuation of application No. 13/109,122, filed on May 17, 2011.

(51) Int. Cl.
*G06F 15/173* (2006.01)

(52) U.S. Cl. ...... 709/226; 709/224; 726/4; 707/999.003

(58) Field of Classification Search .................. 709/224, 709/226; 726/4; 707/999.003
See application file for complete search history.

(56) References Cited

U.S. PATENT DOCUMENTS

| | | | |
|---|---|---|---|
| 7,685,109 B1 * | 3/2010 | Ransil et al. ............ | 707/999.003 |
| 7,925,786 B2 | 4/2011 | Blinn ............................. | 709/245 |
| 2007/0005689 A1 | 1/2007 | Leighton et al. ............. | 709/203 |
| 2007/0067465 A1 | 3/2007 | Blinn et al. ................... | 709/229 |
| 2007/0192493 A1 * | 8/2007 | Manolache et al. .......... | 709/226 |
| 2008/0082554 A1 | 4/2008 | Pedersen ...................... | 707/100 |
| 2009/0119402 A1 * | 5/2009 | Shull et al. .................... | 709/224 |
| 2009/0193070 A1 | 7/2009 | Rodriguez .................... | 709/203 |
| 2010/0125895 A1 | 5/2010 | Shull et al. .......................... | 726/4 |
| 2011/0055331 A1 | 3/2011 | Adelman et al. ............. | 709/206 |

FOREIGN PATENT DOCUMENTS

WO    WO2009047783    4/2009

OTHER PUBLICATIONS

Wendal et al., *"Donar: Decentralized Server Selection for Cloud Services"* SIGCOMM '10, Aug. 30-Sep. 3, 2010, pp. 231-242.
"Verify Domain Ownership" [online] Google Apps Help 2011, [retrieved on Jul. 8, 2011]. Retrieved from the Internet: <URL: www.gwmicro.com/products>.
Amazon Simple Storage Service Developer Guide, API Version Mar. 1, 2006; Amazon Web Services LLC 2010; pp. 1-331.

* cited by examiner

*Primary Examiner* — Kyung H Shin
(74) *Attorney, Agent, or Firm* — Fish & Richardson P.C.

(57) ABSTRACT

In one general aspect, this document describes a computer-implemented method for creating buckets in a hosted storage platform. The method may include receiving, at a hosted storage computer system that utilizes a single namespace across data stores of the hosted storage computer system, a request from a user of the hosted storage computer system to create a bucket having a name that includes a domain name. The method may also include verifying that the user is an authorized manager of a domain that corresponds to the domain name. The method may also include creating the bucket on the hosted storage computer system upon verification that the user is an authorized manager of the domain.

18 Claims, 5 Drawing Sheets

DOMAIN NAME BUCKETS IN A HOSTED STORAGE SYSTEM

CROSS-REFERENCE TO RELATED APPLICATIONS

This application is a continuation application of and claims priority from U.S. patent application Ser. No. 13/109,122, filed on May 17, 2011. The contents of the prior application are incorporated herein by reference in their entirety.

TECHNICAL FIELD

This document relates to creating buckets in hosted storage systems.

BACKGROUND

Hosted or cloud-based storage refers to off-site or remote data storage that is typically provided by a third party. The third party may implement the hosted storage in a data center, and may provide access to the hosted storage over a network, such as the Internet.

Domain names, which are generally easy-to-remember names that are associated with one or more IP addresses, may be used in a variety of networking contexts, including the hosted storage context. A domain name is made up of one or more labels separated by dots, where the rightmost label defines the top-level domain (TLD), and each label to the left of another label is considered a subdomain of the domain to the right. Using sports.example.com as an example of a domain name, com is the top-level domain, example.com is a subdomain of the com domain and may be referred to as a second-level domain, and sports.example.com is a subdomain of the example.com domain and may be referred to as a third-level domain.

Second-level domains such as example.com may often represent important branding assets for organizations that wish to maintain a presence on the Internet. Third-level domains, such as sports.example.com or news.example.com may represent various products or Internet properties associated with the domain, and may similarly represent important branding assets of an organization.

SUMMARY

In one general aspect, this document describes a computer-implemented method for creating buckets in a hosted storage platform. The method may include receiving, at a hosted storage computer system that utilizes a single namespace across data stores of the hosted storage computer system, a request from a user of the hosted storage computer system to create a bucket having a name that includes a domain name. The method may also include verifying that the user is an authorized manager of a domain that corresponds to the domain name. The method may also include creating the bucket on the hosted storage computer system upon verification that the user is an authorized manager of the domain.

In some implementations, verifying that the user is an authorized manager of the domain may include analyzing a webpage on the domain to determine whether the webpage includes a metadata tag that indicates user control of the webpage, or identifying a file hosted on the domain that indicates user control of the domain, or analyzing a domain name system (DNS) record to determine whether the DNS record includes an indication of user control over the domain, or querying a third-party verification service to determine whether the user is an authorized manager of the domain. The method may also include allowing the user to create buckets that are named to include subdomains of the domain without verifying that the user is an authorized manager of the subdomain.

In another general aspect, this document describes a computer-implemented system for creating buckets in a hosted storage platform. The system may include an interface of a hosted storage computer system arranged to receive, at the hosted storage computer system, a request from a user of the hosted storage computer system to create a bucket on the hosted storage computer system, the bucket having a name that includes a domain name. The system may also include a verification module arranged to verify whether the user is an authorized manager of a domain that corresponds to the domain name before allowing the user to create the bucket on the hosted storage computer system.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Hosted storage systems may store and share data using abstractions such as buckets and data resources. Buckets may contain data resources, similar to how directories contain files. Data resources may contain arbitrary data of any size, e.g., from a few bytes up to terabytes of data or more. Buckets may reside in a single namespace of the hosted storage system, and as a consequence, every bucket name may be required to be unique in the context of the hosted storage system. In such a situation, when a user attempts to create a bucket using a bucket name that has already been taken, the hosted storage system cannot create the bucket, and may instead respond with an error.

Bucket names, like domain names, may carry important branding qualities that an organization may wish to protect. For example, an organization that operates the domain example.com may not want a competitor or any other users of the hosted storage system to be allowed to create buckets that include the name example.com. However, in a hosted storage system that does not place any restrictions preventing such actions, any user can create buckets using any unique name, including those that include domain names. When a user who is not associated with a particular organization is allowed to create a bucket using a domain name associated with the organization's domain, the organization may have no other recourse than to reach an agreement with the user to give up the bucket. In such an environment, a land-grab scenario may be likely to develop.

According to the techniques described here, a hosted storage system may prevent such a scenario by allowing a user to create a bucket that includes a domain name only if the user is able to prove that he or she is an authorized manager of the respective domain. In addition to avoiding the land-grab scenario described above, such techniques may also allow authorized users to dynamically create buckets that include their respective domain names without having to worry that those bucket names have already been taken.

Figure 1:
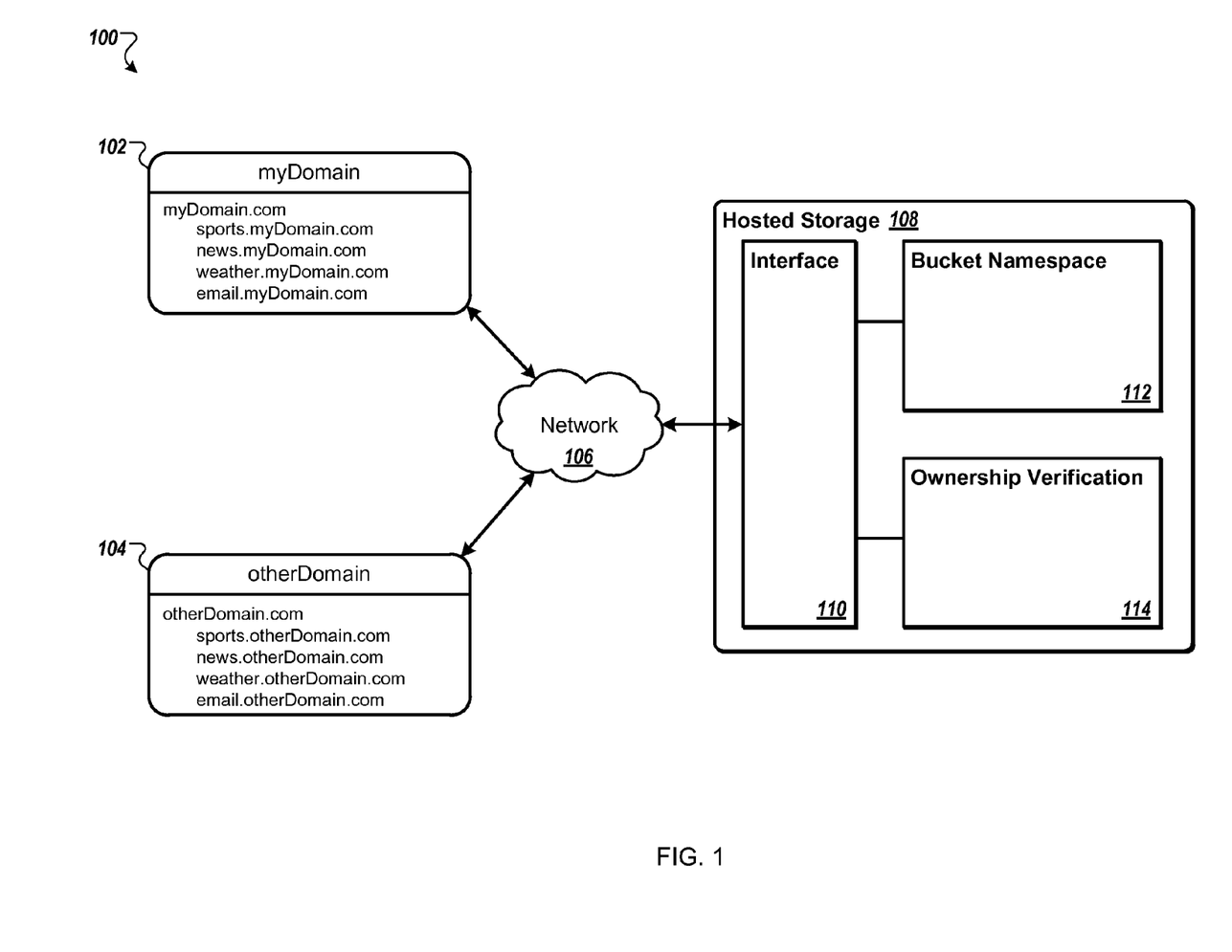
FIG. 1 is a conceptual diagram showing an example of an environment for creating buckets on a hosted storage system.

FIG. 1 is a conceptual diagram showing an example environment 100 for creating buckets on a hosted storage system 108. As shown, environment 100 includes multiple domains 102 and 104, each of which may communicate with a hosted storage system 108 over a network 106, such as the Internet. Only two domains are shown for clarity of presentation, but it should be understood that any number of domains may utilize hosted storage system 108 for purposes of storing and/or hosting all or portions of their data. In addition to domains, users who are not associated with domains may also utilize hosted storage system 108 to store and/or host their data.

Domain 102 may be referred to as myDomain, which may correspond to the second-level domain of a company called myDomain. The company's primary website may be hosted on the second-level domain of myDomain.com. In addition to the primary website, myDomain.com may also host additional Internet properties, which may be distinguished from the primary website using third-level domains. For example, as shown, domain 102 may include a number of properties, such as sports.myDomain.com, news.myDomain.com, weather.myDomain.com, and email.myDomain.com.

Domain 104 may be referred to as otherDomain, and may correspond to the second-level domain of a company called otherDomain. Similarly to myDomain, otherDomain may host its primary website on the second-level domain of otherDomain.com, and may also include one or more additional Internet properties hosted on third-level domains.

The myDomain and otherDomain companies may each employ one or more domain administrators to manage and administer their respective domains, and one or more site administrators to manage and administer sites on their respective domains. Typically, domain administrators may be allowed to access and change various configurations associated with the domain. For example, a domain administrator may be responsible for maintaining the domain's DNS configuration, e.g., to ensure that outside users are able to reach the company's servers using the myDomain.com domain name. Site administrators may be allowed to access and change various configurations associated with sites hosted on the domain. For example, a site administrator of myDomain may have the ability to change the content of a webpage hosted at myDomain.com. A site administrator may also have the ability to add pages to a site hosted on the domain. As described in further detail below, domain administrators and/or site administrators may, in some cases, be considered authorized managers of a particular domain.

Domains 102 and/or 104 may utilize hosted storage system 108 to store or host portions or all of the data associated with the respective domains. Hosted storage system 108 may include an interface 110 through which domain users may be able to interact with the hosted storage system 108. For example, interface 110 may provide front-end services to users accessing the system, and may in turn call one or more back-end interfaces to implement the desired actions of the users. These interactions are shown in more detail in FIG. 2 with respect to a particular implementation of a hosted storage system. However, for purposes of clarity, FIG. 1 shows a hosted storage system 108 that includes interface 110, a bucket namespace 112, and an ownership verification module 114.

As described above, the bucket namespace 112 of hosted storage system 108 may be a global namespace across the entire hosted storage system 108. In other implementations, the namespace may be split into two or more segments, but may still employ the techniques described here with respect to each of the two or more segments. Regardless of the configuration, the bucket namespace 112 or a segment of the namespace may require unique bucket names, such that a request to create a bucket having a name that has already been taken will be denied.

For a number of different reasons, the hosted storage system 108 may wish to ensure that buckets having bucket names that correspond to or include domain names may only be created by authorized managers of the domain associated with the domain names chosen for the buckets. As used herein, the term domain name buckets may be used to refer to buckets named in such a manner. As an example of this concept, a user who is not an authorized manager of the domain myDomain.com may be prevented from creating a domain name bucket named myDomain.com, sports.myDomain.com, or other names that include the myDomain.com domain name. The hosted storage service 108 may include an ownership verification module 114 that determines whether the user attempting to create a bucket named myDomain.com is an authorized manager of the domain. If so, the user may be allowed to create the bucket, assuming a bucket named myDomain.com has not already been created. If not, the user may be prevented from creating the bucket.

After a user has proven that he or she is an authorized manager of the domain, the user may, in some cases, also be allowed to create buckets that include subdomain names within the domain. For example, if a user has proven ownership of the myDomain.com domain, the user may automatically be able to create domain name buckets for subdomains, such as sports.myDomain.com. In some implementations, a user who has proven ownership of a domain may not automatically be allowed to also create domain name buckets for subdomains. In such implementations, ownership may need to be established, for example, at every domain level at which the user wishes to create domain name buckets.

Authorized managers of a domain may also be able to create buckets that do not directly correspond to a subdomain, but that still include the domain name as part of the name. For example, an authorized manager of the myDomain.com domain may be able to create a bucket named bucket1.myDomain.com, regardless of whether a subdomain named bucket1 exists on the domain. Such functionality may be used in a number of different contexts, including for example, the programmatic creation of buckets that are guaranteed to be available on the hosted storage system. In one example, an authorized domain manager may wish to dynamically create separate buckets for each customer of the domain to ensure that the customer's data is not intermingled with other customers' data. When a new customer signs up for the service, the domain may programmatically create a new bucket for that customer, e.g., a bucket named customerID.myDomain.com, where customerID is replaced with the customer's ID on the domain. Assuming that the domain ensures that customer IDs are unique on the domain, the bucket name is guaranteed not to have already been taken, e.g., by the domain or by other users of the system.

The term "authorized manager" may include a number of different users who are associated with a particular domain, depending on the level of authority or control the domain wishes to provide to its members. As such, the ownership verification module 114 may utilize a number of different techniques to determine whether the user attempting to create a bucket has the appropriate level of authority before allowing the user to create the bucket. In practice, a domain may limit the number of authorized managers to a relatively small subset of individuals who are entrusted with managing the domain, but the techniques described here can accommodate any number of authorized managers for a given domain. An authorized manager of a domain may also be referred to as an owner of the domain.

In some implementations, the ownership verification module 114 may utilize one or more site-based techniques to determine whether a user is an authorized manager of the domain. Site-based techniques may rely upon an assumption that, if the user is able to introduce content into files hosted on the domain, or is able to upload files to be hosted on the domain, then the user has demonstrated enough control or authority to be considered an authorized manager of the domain. For example, a user may be deemed an authorized manager if he or she is able to modify a homepage that is hosted on the domain, e.g., by inserting a metadata tag in the homepage. As another example, a user may demonstrate control of the domain if he or she is able to add a file to the domain.

The ownership verification module 114 may provide tokens or special files to a user who wishes to demonstrate ownership or control of the domain. For example, when a user attempts to create a domain name bucket on hosted storage system 108, the ownership verification module 114 may determine that the user has not yet proven that he or she is an authorized manager of the domain. In turn, the ownership verification module 114 may provide a token or a special file to the user, along with instructions for the user that describe where the ownership verification module 114 expects to find the token or the special file on the domain. If the user is subsequently able to insert the token, e.g., as a metadata tag, onto a page hosted on the domain, or is able to upload the special file to the domain, the ownership verification module 114 may acknowledge the user's status as an authorized manager of the domain.

In some implementations, the ownership verification module 114 may utilize one or more domain-based techniques to determine whether a user is an authorized manager of the domain. Such domain-based techniques may be used in addition to or as an alternative to the above-described site-based verification techniques. As one example of a domain-based verification technique, a user may prove that he or she is an authorized manager of a domain by creating a TXT record in the domain's DNS settings, which demonstrates that the user is authorized to modify the domain's DNS configuration. The TXT record generally does not affect the functionality of the DNS configuration for the domain, but the ability to add a TXT record demonstrates that the user can log in to the domain registrar or hosting provider to make the change.

The hosted storage system 108 may implement various rules that define a hierarchy of control levels, e.g., based on how the user proved his or her ownership of the domain. For example, in some implementations, domain-based verification techniques may supersede site-based verification techniques because the level of control demonstrated by a user who has been verified using domain-based techniques may be greater than the level of control demonstrated by a user who has been verified using site-based techniques. In such implementations, when one or more users has been verified as an authorized domain manager using domain-based verification techniques, the system may prevent other users from creating domain name buckets even if those users are able to prove their authority using site-based verification techniques. Similarly, if one or more users have already demonstrated control of the domain using site-based verification, and a subsequent user demonstrates control of the domain using domain-based verification, the users who have only demonstrated site-based control may no longer be allowed to create buckets that correspond to domain names unless they are granted permission by the user who was verified using domain-based verification techniques.

Other configurable rules may also be implemented. For example, different hierarchies of control may be established, e.g., based on the manner in which the user's authority was verified, and different rules may be applied to how such control levels are managed. In some cases, a hosted storage system 108 may not differentiate between users who have demonstrated a particular level of control over the domain, regardless of how the control was proven. In such cases, all users who have proven to be authorized managers of the domain, e.g. using either site-based or domain-based verification techniques, may be able to create domain name buckets for the domain.

As shown in environment 100, the ownership verification module 114 is included as part of the hosted storage system 108, but in some implementations, portions or all of the functionality of the ownership verification module 114 may be implemented by a separate system or group of systems. The separate system or group of systems may be operated by the same entity as the hosted storage system, or by a third party in some cases. For example, in some implementations, the ownership verification module 114 may be operated by the same entity as the hosted storage system, but as part of a verification service that operates outside the context of the hosted storage system. In other implementations, the ownership verification module 114 may be operated by a trusted third party verification service. In such implementations, when a user of the hosted storage system 108 attempts to create a bucket having a name that includes a domain name, the hosted storage system 108 may query the third party verification service to determine whether the user is an authorized manager of the domain. The third party verification service may utilize the site-based and/or domain-based techniques described above, or may additionally or alternatively utilize other appropriate techniques that prove that the particular user is an authorized manager of the domain.

Figure 2:
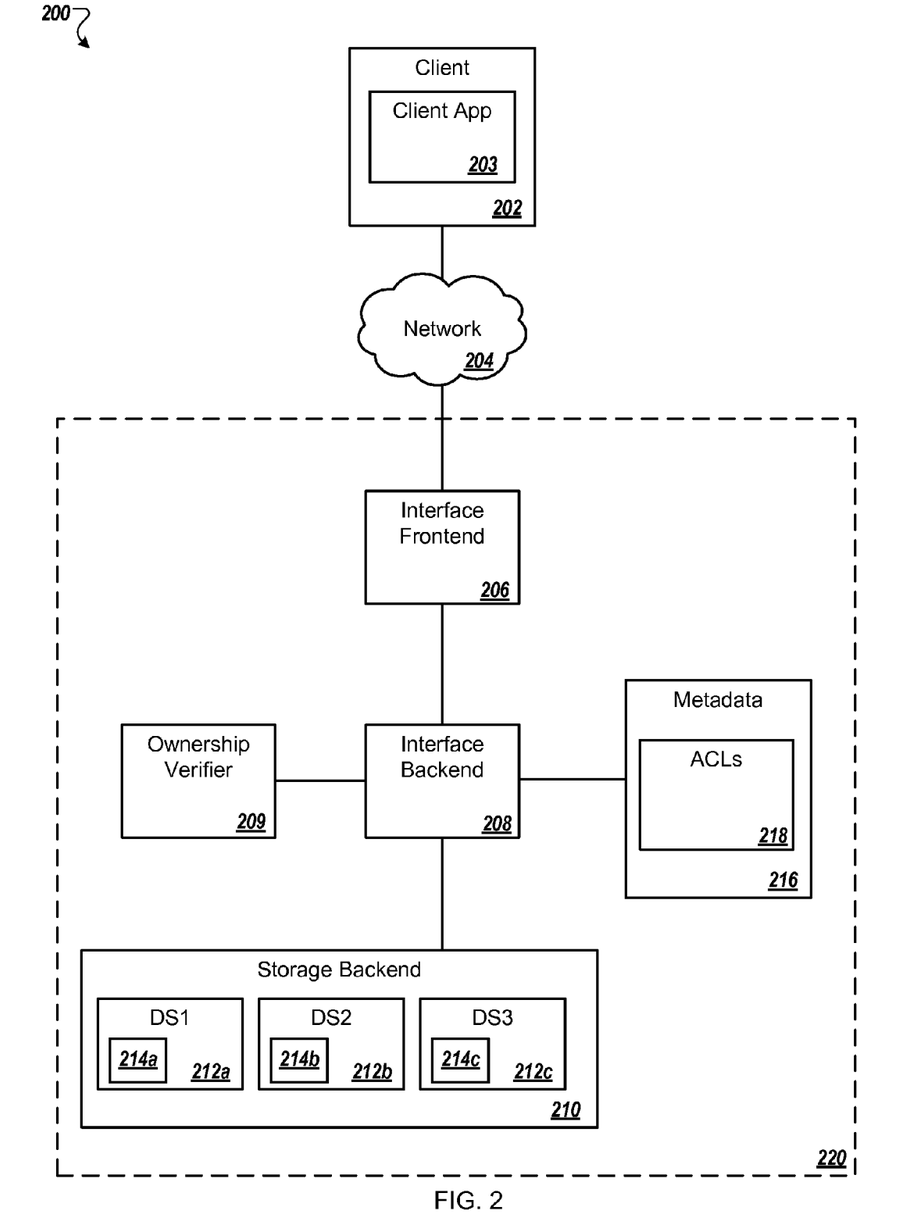
FIG. 2 is a block diagram showing an example of a system for providing hosted storage and accessing the hosted storage from a client device.

FIG. 2 is a block diagram showing an example of a system 200 for providing hosted storage and accessing the hosted storage from a client device 202. In some implementations, a hosted storage service 220 may provide access to stored data by applications running on computing devices operating separately from one another, provide offsite data backup and restore functionality, provide data storage to a computing device with limited storage capabilities, and/or provide storage functionality not implemented on a computing device.

The system 200 may provide scalable stores for storing data resources. The client device 202 may upload data resources to the hosted storage service 220 and control access to the uploaded data resources. Access control may include a range of sharing levels (e.g., private, shared with one or more individuals, shared with one or more groups, public, etc.). The client device 202 may store data in the hosted storage service 220 for any number of a variety of reasons. For example, data may be stored for business reasons (e.g., submission of work product ordered by the owner of the hosted storage service 220), or for use in data processing by other services (e.g., using uploaded images to automatically and dynamically create a photo gallery web page).

Figure 5:
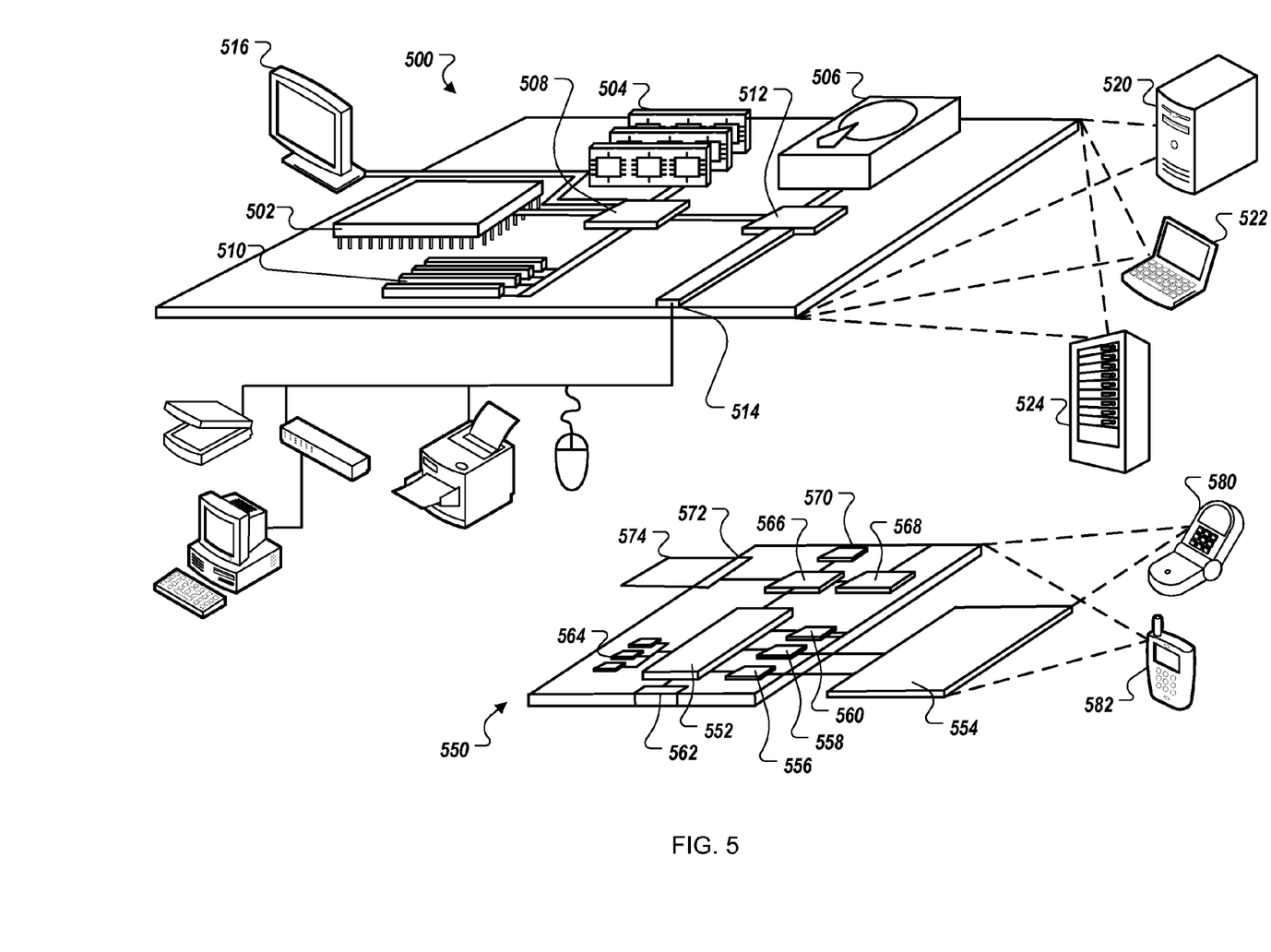
FIG. 5 shows an example of a computing device and a mobile computing device that can be used to implement the techniques described here.

The client device 202 may be implemented using a computing device, such as the computing device 500 or the mobile device 550 described with respect to FIG. 5. The client device 202 may communicate with the hosted storage service 220 via a network 204, such as the Internet. The client device 202 may communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 202 is shown, there may be multiple client devices communicating across the network 204 with the hosted storage service 220 and/or other services and devices.

The hosted storage service 220 may be implemented such that client applications executing on client device 202, such as a client application 203, may store, retrieve, or otherwise manipulate data resources in the hosted storage service 220. The hosted storage service 220 may be implemented by one or more server devices, which may be implemented using a computing device, such as the computing device 500 or mobile device 550 described with respect to FIG. 5. For example, the hosted storage service 220 may be implemented by multiple server devices operating in the same, or different, data centers.

The hosted storage service 220 generally includes an interface frontend 206, an interface backend 208, a storage backend 210, and metadata 216 for resources stored in the storage backend 210. The hosted storage service 220 may also include on ownership verifier 209 to verify that a user requesting creation of a domain name bucket is an authorized manager of the domain before allowing the bucket to be created on the hosted storage service 220.

In general, the interface frontend 206 may receive requests from and send responses to the client device 202. For instance, the hosted storage service 220 may be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Interface frontend 206 may receive messages from the client 202 and parse the requests into a format usable by the hosted storage service 220, such as a remote procedure call (RPC) to an interface backend 208. The interface frontend 206 may write responses generated by the hosted storage service 220 for transmission to the client 202. In some implementations, multiple interface frontends 206 may be implemented, for example to support multiple access protocols.

The interface frontend 206 may include a graphical front end, for example to display on a web browser for data access. The interface frontend 206 may include a sub-system to enable managed uploads and downloads of large files (e.g., for functionality such as pause, resume, and recover from time-out). The interface frontend 206 may monitor load information and update logs, for example to track and protect against denial of service (DOS) attacks.

As described above, the Web Service API may be a REST-based HTTP interface. In a REST-based interface, a data resource is accessed as a resource, uniquely named using a URI, and the client application 203 and service 220 exchange representations of resource state using a defined set of operations. For example, requested actions may be represented as verbs, such as by HTTP GET, PUT, POST, HEAD, and DELETE verbs. The GET verb may be used to retrieve a resource, while the HEAD verb may be used to retrieve information about a resource without retrieving the resource itself. The DELETE verb may be used to delete a resource from the hosted storage service 220. The PUT and POST verbs may be used to upload a resource to the service 220. PUT requests may come from the client 202 and contain authentication and authorization credentials and resource metadata in a header, such as an HTTP header. POST requests may be received when a client 202 wants to upload from a web browser form. The form POST upload protocol for the hosted storage service 220 may involve multiple form fields to provide authentication, authorization, and resource metadata. More generally, any of the API requests may include credentials for authentication and authorization, for example in a header of the request. An authorization header may be included in the REST requests, which may include an access key to identify the entity sending the request.

Alternatively, or additionally, a user may be authenticated based on credentials stored in a browser cookie, which may be appended to the API requests. If no valid cookie is present, a redirect to an authentication frontend may be generated, and the authentication frontend may be used to generate the browser cookie. The authentication frontend may be used by systems and services in addition to the hosted storage service 220 (e.g., if the organization operating the hosted storage service 220 also operates other web services such as email service). A user may also or alternatively be authenticated based on authentication credentials from an external credentialing service or an external service that includes credentialing functionality. User or group identifier information may be calculated from the external service's credential information. Requests sent by the client 202 to the interface frontend 206 may be translated and forwarded to the external service for authentication.

In general, resources stored in the hosted storage service 220 may be referenced by resource identifiers. The hosted storage service 220 may define namespaces to which a valid resource identifier must conform. For example, the namespace may require that resource identifiers be a sequence of Unicode characters whose UTF-8 encoding is at most 1024 bytes long. As another example, the namespace may require that resource identifiers be globally unique identifiers (GUIDs), which may be 228-bit integers.

Resources may be stored in hosted storage service 220 in buckets. In some examples, each bucket is uniquely named in the hosted storage service 220, each data resource is uniquely named in a bucket, and every bucket and data resource combination is unique. Data resources may be uniquely identified by a URI that includes the bucket name and the resource name, and identifies the hosted storage service 220. For example, a resource named "long/song.mp3" in a bucket named "music" could be specified using a URI pattern such as http://s.hostedstoragesystem.com/music/long/song.mp3 or http://music.s.hostedstoragesystem.com/long/song.mp3.

Alternatively, the user of the client 202 may create a bucket named my.music.org, publish a CNAME alias redirected to http://music.s.hostedstoragesystem.com, and address the resource as http://my.music.org/long/song.mp3. In some examples, buckets do not nest.

As another example, rather than using a CNAME to redirect my.music.org to the hosted storage system 220, a user of the client 202 may create the my.music.org bucket directly in the hosted storage system 220. As described above, in such a scenario, before a user may be allowed to create the bucket named my.music.org in the hosted storage system 220, the user may be required to prove that he or she is an authorized manager of the music.org domain. In some implementations, the user may prove ownership of the domain using one or more site-based verification techniques, such as by placing a token in a metadata tag of the www.music.org homepage or by uploading a special file to the music.org domain. As another example, the user may prove ownership of the domain using one or more domain-based verification techniques, such as by modifying the DNS configuration of the domain in a manner specified by the ownership verifier 209.

If the user chooses to prove ownership using a site-based verification technique, the ownership verifier 209 may issue a token, e.g., a cryptographic token or other appropriate token, or a special file to the user, and may provide the user with instructions for placement of the token or the file. The ownership verifier 209 may then wait until the user indicates that he or she has complied with the instructions. Upon receiving an indication that the user has complied with the instructions, the ownership verifier 209 may analyze the domain to verify that the user has complied with the instructions. For example, the ownership verifier 209 may analyze the www.music.org homepage to determine whether the token that was issued to the user is included in a metadata tag of the page. If so, the ownership verifier 209 may acknowledge that the user is an authorized manager of the domain because he or she was able to modify the content of a site on the domain. Similarly, if the user chooses instead to use the special file, the ownership verifier 209 may examine the www.music.org domain to determine whether the special file has been uploaded to the domain. If so, then the user has proven that he or she has at least enough control to add files to the domain, and may therefore be determined to be an authorized manager of the domain.

If the user chooses to prove ownership using a domain-based verification technique, the ownership verifier 209 may provide a token, e.g., a cryptographic token or other appropriate token, to the user for inclusion in a DNS TXT record associated with the domain. After the user indicates that he or she has modified the DNS configuration, the ownership verifier 209 may analyze the DNS configuration of the domain to verify that the user was able to modify the configuration. For example, the ownership verifier 209 may analyze a DNS record associated with the domain to determine whether the DNS record includes an indication of user control over the domain, e.g., through the inclusion of the token in the DNS TXT record.

The interface backend 208 may handle request authentication and authorization, may manage data and metadata, and may track activity such as for billing. As one example, the interface backend 208 may query the ownership verifier 209 when a request for creation of a domain name bucket is received. The interface backend 208 may also provide additional or alternative functionality. For example, the interface backend 208 may provide functionality for independent frontend/backend scaling for resource utilization and responsiveness under localized heavy loads. Data management may be encapsulated in the interface backend 208 while communication serving may be encapsulated in the interface frontend 206. The interface backend 208 may isolate certain security mechanisms from the client-facing interface frontend 206.

The interface backend 208 may expose an interface usable by both the interface frontend 206 and other systems. In some examples, some features of the interface backend 208 are accessible only by an interface frontend (not shown) used by the owners of the hosted storage service 220 (internal users). Such features may include those needed for administrative tasks (e.g., resolving a resource reference to a low level disk address). The interface backend 208 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 208 may manage metadata 216 associated with data resources, for example in a MySQL database or BigTable. User-specified names labeling the buckets can be completely defined within the metadata 216, and resource metadata 216 can map a resource name to one or more datastores 212 storing the resource. The metadata 216 can also contain bucket and resource creation times, resource sizes, hashes, and access control lists 218 (ACL 218) for both buckets and resources. The interface backend 208 can log activity and track storage consumption to support accounting for billing and chargebacks. In some examples, this includes quota monitoring in each dimension in which customers are charged (e.g., reads, writes, network transfers, total storage in use).

The ACLs 218 may generally define who is authorized to perform actions on corresponding buckets or resources, and the nature of the permitted actions. The ACLs 218 may be an unordered list of {scope, role} pairs, plus Boolean flags. The scope may define a user or group of users and the role may define the access permissions for the user or group. In some examples, the union of all {scope, role} pairs may define access rights. In some examples, more specific {scope, role} pairs override more general ones.

The storage backend 210 may contain multiple datastores 112a-112c. Although three datastores 212 are shown, more or fewer are possible. Each of the datastores 112a-112c may store data resources 114a-114c in a particular format. For example, data store 112a may store a data resource 114a as a Binary Large Object (BLOB), data store 112b may store a data resource 114b in a distributed file system (e.g., Network File System, Google File System), and data store 112c may store a data resource 114c in a MySQL database or BigTable for example.

In some implementations, the hosted storage system 220 may receive, e.g., at the interface frontend 206, a request to create a domain name bucket, e.g., from client application 203. The interface frontend 206 may process the request, and may forward the request to the interface backend 208. The interface backend 208 may then query the ownership verifier 209 to verify whether the user of client device 202 has the proper authority to create the domain name bucket. If so, the interface backend 208 may process the request to create the bucket. If not, the hosted storage system 220 may send a response to the client application 203 indicating that the bucket cannot be created. Some examples of the processing that may be performed by the hosted storage system 220 are discussed in greater detail below.

Figure 3:
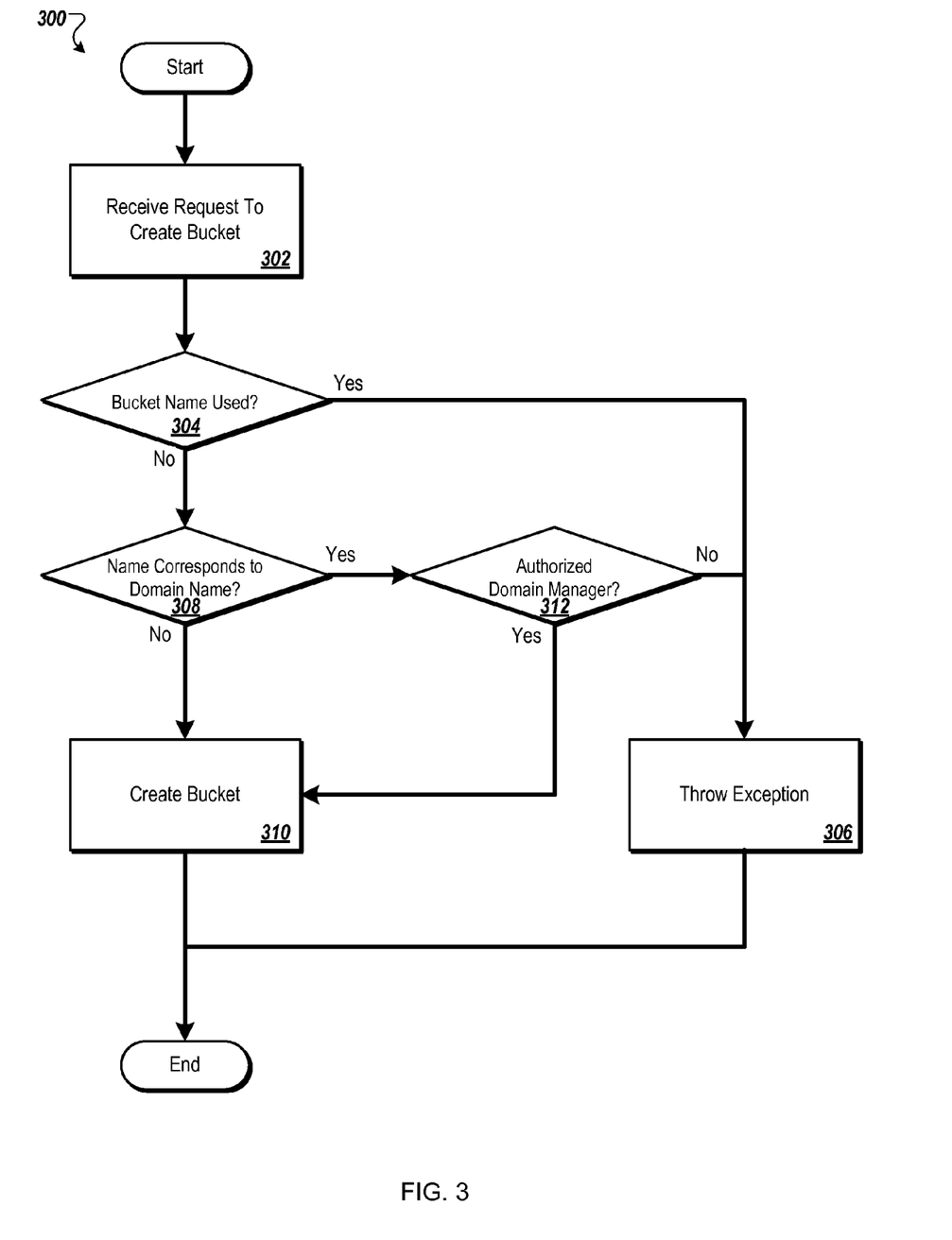
FIG. 3 is a flow chart showing an example of a process for creating a bucket on a hosted storage system.

FIG. 3 is a flow chart showing an example of a process 300 for creating a bucket on a hosted storage system. Process 300 may be performed, for example, by the interface frontend 206, the interface backend 208, and/or the ownership verifier 209 of FIG. 2. For clarity of presentation, the description that follows uses the system 200 as the basis for describing the process. However, it should be understood that another system, or combination of systems, may be used to perform the process.

Process 300 begins when a request is received by the interface frontend 206 from client application 203 to create a bucket (302). The hosted storage service 220 may determine whether the bucket name is already being used in the namespace of the system (304). For example, the interface backend 208 may query metadata 216 to determine whether the bucket name already exists. If so, then the process may throw an exception (306). For example, the process may throw an exception indicating that a bucket already exists with the requested bucket name, and may prompt the user to try a different bucket name.

If the bucket name is not already in use, the hosted storage service 220 may determine whether the requested bucket name corresponds to a domain name (308). Because the universe of possible domain names is very large, hosted storage service 220 may consider any bucket name that includes a dot to correspond to a domain name. In other implementations, hosted storage service 220 may identify domain name buckets in a different manner, such as by considering any bucket name that includes any of the known TLDs (e.g., .com, .org, .net, etc.) to correspond to a domain name. If the requested bucket name does not correspond to a domain name, the service may create the bucket (310), because the user is the first to create the bucket, and the bucket name is not a domain name that should be protected using the techniques described herein.

On the other hand, if the requested bucket name does correspond to a domain name, the hosted storage service 220 may determine whether the user is an authorized domain manager of the associated domain (312). The determination of whether the user is an authorized domain manager may involve, for example, one or more site-based and/or domain-based verification techniques as have already been described, and as described below in the description of FIG. 4. The determination may include a combination of these or other appropriate ownership verification techniques.

If the hosted storage service 220 determines that the user is an authorized manager of the domain, then the service may create the bucket (310). If not, then the service may throw an exception (306). In some implementations, the exception may prompt the user that only authorized domain managers are permitted to create domain name buckets, and may further provide information instructing the user how to prove ownership of the domain. For example, in implementations that use a third party verification service to verify the ownership of a domain, the hosted storage service 220 may provide a link to the third party verification service for further instructions.

Figure 4:
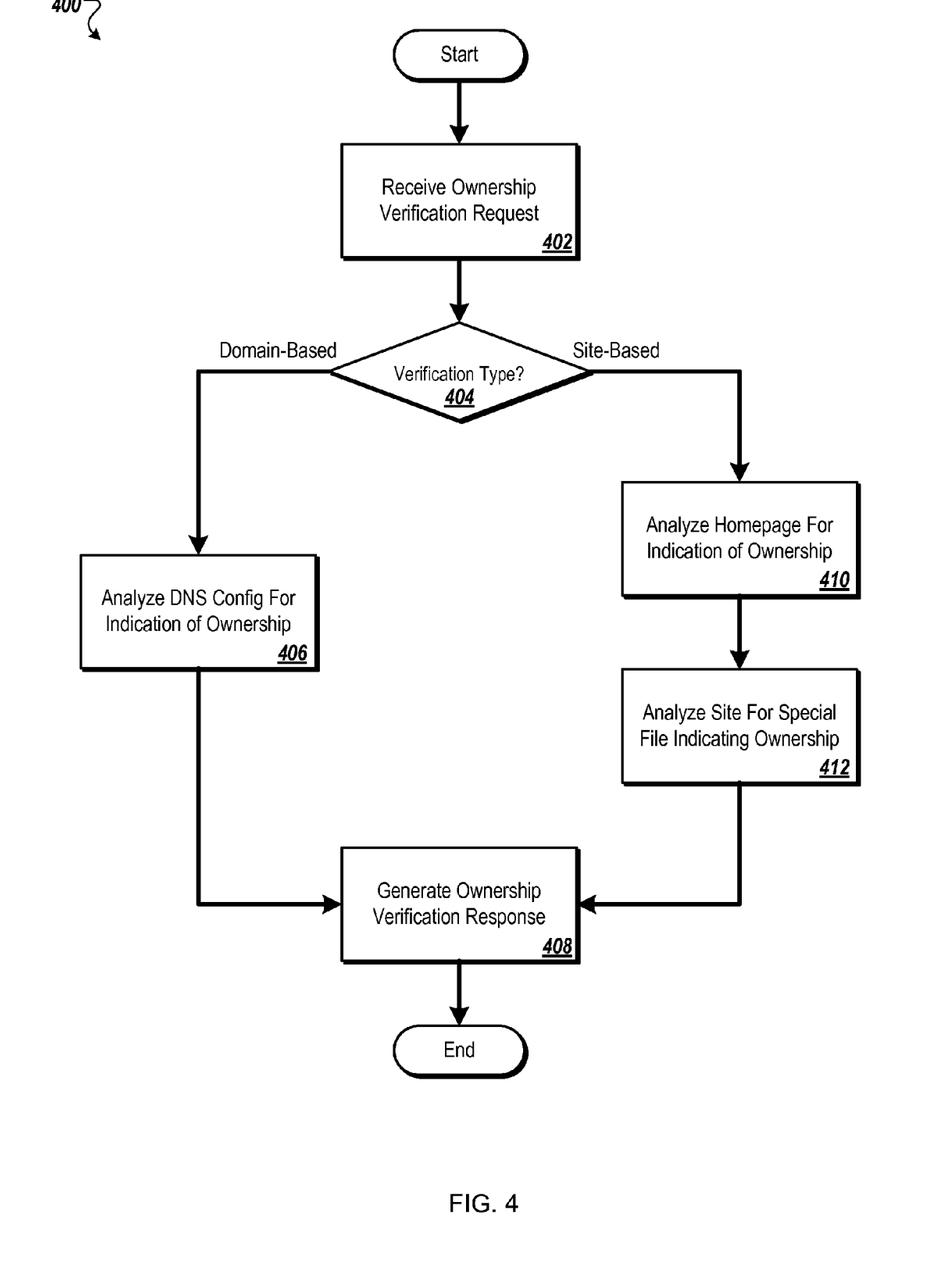
FIG. 4 is a flow chart showing an example of a process for verifying domain ownership for a user of a hosted storage system.

FIG. 4 is a flow chart showing an example of a process 400 for verifying domain ownership for a user of a hosted storage system. Process 400 may be performed, for example, by the ownership verifier 209 of FIG. 2. For clarity of presentation, the description that follows uses the system 200 as the basis for describing the process. However, it should be understood that another system, or combination of systems, may be used to perform the process.

Process 400 begins when a request is received to verify the ownership of a particular domain (402), e.g., by the ownership verifier 209 from interface backend 208. The ownership verification request may be in response to a user attempting to create a domain name bucket on hosted storage service 220. The ownership verifier 209 may provide one or more verification techniques that may then be used to verify the authorization of the user. In some implementations, the user may be allowed to choose the verification technique that is used to verify whether the user is an authorized manager of the domain. In other implementations, the ownership verifier 209 may require a certain verification type, e.g., based on the level of authority the user wishes to establish.

If the system determines that a domain-based verification technique is to be used (404), the system may instruct the user to make a specific change to the DNS configuration associated with the domain. The ownership verifier 209 may provide the user with instructions regarding the specific change to be made, and after the user indicates that the change has been made, the ownership verifier 209 may analyze the DNS configuration to determine whether the change has been made (406). In some implementations, the user may be instructed to include a token from the ownership verifier 209 in a DNS TXT record associated with the domain. If the ownership verifier 209 determines that the change to the DNS configuration has in fact been made, the ownership verifier 209 may conclude that the user is an authorized manager of the domain. The ownership verifier 209 may then generate an ownership verification response (408) indicating that the user is an authorized manager, and as such, may create domain name buckets on the hosted storage service 220.

If the system determines that a site-based verification technique is to be used (404), the system may instruct the user to make a specific change to a site hosed on the domain. The ownership verifier 209 may provide the user with instructions regarding the specific change to be made, and after the user indicates that the change has been made, the ownership verifier 209 may analyze the site to determine whether the change has been made. For example, the ownership verifier 209 may analyze the site's homepage for an indication of ownership (410). In such an example, the ownership verifier 209 may instruct the user to include a token from the ownership verifier 209 in a metadata tag of the site's homepage. The ownership verifier 209 may also or alternatively analyze the site for the inclusion of a special file indicating that the user owns the domain (412). In such an example, the ownership verifier 209 may generate a special file, and provide the file to the user. The user may then be instructed to upload the file to a specific location of the site, which the ownership verifier 209 may subsequently check. In some implementations, the user may be instructed to complete either one or both of these changes in order to be verified as an authorized manager of the domain.

If the ownership verifier 209 determines that the change to the site has in fact been made, the ownership verifier 209 may conclude that the user is an authorized manager of the domain. The ownership verifier 209 may then generate an ownership verification response (408) indicating that the user is an authorized manager, and as such, may create domain name buckets on the hosted storage service 220.

In some implementations, the ownership verifier 209 may also store domain ownership information for users who have already proven control or ownership of a particular domain. In these implementations, the ownership verifier 209 may determine whether such information exists for the particular domain associated with the bucket to be created, and if the module can determine that the user has already proven his or her ownership of the domain, the module may generate the ownership verification response without re-verifying the user's authorization.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a microdrive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures may not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for creating buckets in a hosted storage platform, the method comprising:
receiving, at a hosted storage computer system that utilizes a single namespace across data stores of the hosted storage computer system for a plurality of users, a request from a first user of the hosted storage computer system to create a first bucket having a name that includes a domain name;
verifying, using a domain-based verification protocol, that the first user is an authorized manager of a domain that corresponds to the domain name, wherein the domain-based verification protocol includes verifying that the first user is authorized to modify a DNS configuration of the domain;
creating the first bucket on the hosted storage computer system in response to verifying that the first user is an authorized manager of the domain;
verifying, using a site-based verification protocol, that a second user is an authorized manager of the domain that corresponds to the domain name, wherein the site-based verification protocol includes verifying that the user is able to introduce content into files hosted on the domain or verifying that the user is able to upload files to be hosted on the domain;

after verifying that the first user is an authorized manager of the domain using a domain-based verification protocol:

receiving, at the hosted storage computer system, a second request from the second user of the hosted storage computer system to create a second bucket having a name that includes the domain name; and denying the second request to create the second bucket.

2. The method of claim 1, wherein verifying that the second user is an authorized manager of the domain comprises analyzing a webpage on the domain to determine whether the webpage includes a metadata tag that indicates first user control of the webpage.

3. The method of claim 1, wherein verifying that the second user is an authorized manager of the domain comprises identifying a file hosted on the domain that indicates first user control of the domain.

4. The method of claim 1, wherein verifying that the first user is an authorized manager of the domain comprises analyzing a DNS record to determine whether the DNS record includes an indication of first user control over the domain.

5. The method of claim 4, wherein the indication of first user control over the domain comprises a token issued to the first user by a verification service.

6. The method of claim 1, further comprising allowing the first user to create buckets that are named to include subdomains of the domain without verifying that the first user is an authorized manager of the subdomain.

7. The method of claim 1, wherein verifying that the first user is an authorized manager of the domain comprises querying a third-party verification service to determine whether the first user is an authorized manager of the domain.

8. A non-transitory computer-readable storage medium storing instructions that, when executed by one or more processing devices, cause the processing devices to perform operations comprising:

receiving, at a hosted storage computer system that utilizes a single namespace across data stores of the hosted storage computer system for a plurality of users, a request from a first user of the hosted storage computer system to create a first bucket having a name that includes a domain name;

verifying, using a domain-based verification protocol, that the first user is an authorized manager of a domain that corresponds to the domain name, wherein the domain-based verification protocol includes verifying that the first user is authorized to modify a DNS configuration of the domain;

creating the first bucket on the hosted storage computer system in response to verifying that the first user is an authorized manager of the domain;

verifying, using a site-based verification protocol, that a second user is an authorized manager of the domain that corresponds to the domain name, wherein the site-based verification protocol includes verifying that the user is able to introduce content into files hosted on the domain or verifying that the user is able to upload files to be hosted on the domain;

after verifying that the first is an authorized manager of the domain using a domain-based verification protocol:

receiving, at the hosted storage computer system, a second request from the second user of the hosted storage computer system to create a second bucket having a name that includes the domain name; and denying the second request to create the second bucket.

9. The computer-readable storage medium of claim 8, wherein verifying that the second user is an authorized manager of the domain comprises analyzing a webpage on the domain to determine whether the webpage includes a metadata tag that indicates first user control of the webpage.

10. The computer-readable storage medium of claim 8, wherein verifying that the second user is an authorized manager of the domain comprises identifying a file hosted on the domain that indicates first user control of the domain.

11. The computer-readable storage medium of claim 8, wherein verifying that the first user is an authorized manager of the domain comprises analyzing a DNS record to determine whether the DNS record includes an indication of first user control over the domain.

12. The computer-readable storage medium of claim 11, wherein the indication of first user control over the domain comprises a token issued to the first user by a verification service.

13. The computer-readable storage medium of claim 8, wherein the operations further comprise allowing the first user to create buckets that are named to include subdomains of the domain without verifying that the first user is an authorized manager of the subdomain.

14. The computer-readable storage medium of claim 8, wherein verifying that the first user is an authorized manager of the domain comprises querying a third-party verification service to determine whether the first user is an authorized manager of the domain.

15. A computer-implemented system for creating buckets in a hosted storage platform, the system comprising:

an interface of a hosted storage computer system that utilizes a single namespace across data stores of the hosted storage computer system for a plurality of users, arranged to:

receive a request from a first user of the hosted storage computer system to create a first bucket having a name that includes a domain name; and receive, after the first user is verified as an authorized manager of the domain using, a domain-based verification protocol, a second request from a second user to create a second bucket having a name that includes a second domain name, the second user not an authorized manager of the domain;

and a verification module arranged to:

verify, using a domain-based verification protocol, that the first user is an authorized manager of a domain that corresponds to the domain name, wherein the domain-based verification protocol includes verifying that the first user is authorized to modify a DNS configuration of the domain;

create the first bucket on the hosted storage computer system in response to verify, using a site-based verification protocol, that a second user is an authorized manager of the domain that corresponds to the domain name, wherein the site-based verification protocol includes verifying that the user is able to introduce content into files hosted on the domain or verifying that the user is able to upload files to be hosted on the domain; and denying, after the first user is an authorized manager of the domain using a domain-based verification protocol, the second request to create the second bucket.

16. The system of claim 15, wherein the verification module analyzes a webpage on the domain to determine whether the webpage includes a metadata tag that indicates first user control of the webpage.

17. The system of claim 15, wherein the verification module identifies a file hosted on the domain that indicates first user control of the domain.

18. The system of claim 15, wherein the verification module analyzes a DNS record to determine whether the DNS record includes an indication of first user control over the domain.

* * * * *

UNITED STATES PATENT AND TRADEMARK OFFICE
CERTIFICATE OF CORRECTION

PATENT NO. : 8,396,969 B1
APPLICATION NO. : 13/252426
DATED : March 12, 2013
INVENTOR(S) : Michael F. Schwartz et al.

Page 1 of 1

It is certified that error appears in the above-identified patent and that said Letters Patent is hereby corrected as shown below:

In the Claims:

Column 17, line 61, in Claim 8, after "first" insert -- user --.

Column 18, line 41, in Claim 15, delete "using," and insert -- using --, therefor.

Column 18, line 56, in Claim 15, after "to" insert -- verifying that the first user is an authorized manager of the domain; --.

Column 18, line 65, in Claim 15, after "is" insert -- verified as --.

Signed and Sealed this
Twenty-first Day of May, 2013

Teresa Stanek Rea
*Acting Director of the United States Patent and Trademark Office*